Figure 1:

United States Patent [19]

Rausing et al.

[11] 4,004,727
[45] Jan. 25, 1977

[54] LAMINATE FOR THE MANUFACTURE OF LIQUID-TIGHT PACKING CONTAINERS AND A BLANK FOR PACKING CONTAINERS MANUFACTURED FROM THE LAMINATE

[75] Inventors: Ruben Anders Rausing, Rome, Italy; Ingemar Wilhelm Ohlsson, Malmo, Sweden

[73] Assignee: Anders Ruben Rausing, Rome, Italy

[22] Filed: Dec. 15, 1975

[21] Appl. No.: 640,943

[30] Foreign Application Priority Data

Jan. 6, 1975 Switzerland .................... 35/75

[52] U.S. Cl. .................... 229/4.5; 428/192; 428/310; 428/910; 428/913
[51] Int. Cl.² .................... B65D 3/00
[58] Field of Search .......... 229/4.5, 5.5, DIG. 12; 428/310, 313, 314, 315, 213, 320, 138, 139, 140, 192, 910, 913

[56] References Cited

UNITED STATES PATENTS

| | | | |
|---|---|---|---|
| 1,943,757 | 1/1934 | Delaney | 428/140 |
| 2,589,045 | 3/1952 | Brooks | 229/5.5 X |
| 2,715,089 | 8/1955 | Michener et al. | 428/140 |
| 3,070,281 | 12/1962 | Durkin et al. | 229/4.5 X |
| 3,143,364 | 8/1964 | Klein | 229/5.5 X |
| 3,207,651 | 9/1965 | Hood et al. | 229/4.5 X |
| 3,391,823 | 7/1968 | Tijms | 428/315 X |
| 3,400,810 | 9/1968 | Makowski | 229/DIG. 12 |
| 3,531,367 | 9/1970 | Karsten | 428/315 |
| 3,706,622 | 12/1972 | Rush | 428/315 |

Primary Examiner—Davis T. Moorhead
Attorney, Agent, or Firm—Pierce, Scheffler & Parker

[57] ABSTRACT

For forming rigid packing containers for liquids, the invention provides a laminate which comprises layers of cellular structure and layers of homogeneous structure, the cellular layers being composed of foamed plastics and the homogeneous layers being either plastic, metal foil, glass fibers or paper, and arranged between the layers of foamed plastics.

8 Claims, 8 Drawing Figures

U.S. Patent  Jan. 25, 1977  Sheet 2 of 2  4,004,727

LAMINATE FOR THE MANUFACTURE OF LIQUID-TIGHT PACKING CONTAINERS AND A BLANK FOR PACKING CONTAINERS MANUFACTURED FROM THE LAMINATE

The present invention relates to a laminate for the manufacture of liquid-tight, relatively rigid packing containers comprising material layers of a cellular structure, as well as material layers of a homogeneous or fibrous structure. The invention also relates to a blank for a packing container manufactured from the laminate, and packing containers made from the said blank.

It is known in packaging technology to use foamed plastics material for the manufacture of packing containers, and the advantage of this material is that it can be made relatively stiff in relation to its weight, that it is heat-insulating and that the material does not absorb liquid. Foamed plastic material of e.g. polystyrene foam has mainly been used for beakers, the beakers being made from previously prepared granules, which are placed in a mould to expand and are joined together to form a body which fills the mould and which is of a cellular structure. These beaker-shaped containers can be made very light, and they have a good heat-insulating capacity. The method of manufacture, however is slow and wasteful.

A more economical method for making packing containers from foamed plastics material consists in first extruding the foamed plastics material in the form of a web which is then in a known manner cut to sheets or is formed into a tube or is shaped in some other manner for the manufacture of packing containers. This extruded foamed plastic material, which often consists of polystyrene foam possibly with a small admixture of butadiene, can be extruded to a relatively small thickness and in any case can be made considerably thinner than the earlier mentioned moulded beakers. One disadvantage of the extruded foamed plastics material consists in that it cannot absorb tensile stresses to any appreciable extent, and that the material easily cracks giving rise to cracking creases, which are ungainly and cause inconveniences when the material is to be made into packages.

The above-mentioned disadvantages are avoided by a laminate in accordance with the invention, which is characterized in that the laminate has two layers of foamed plastic material, preferably polystyrene foam, and at least one homogeneous or fibrous layer, e.g. homogeneous plastic, metal foil or paper is arranged between the said foamed plastic layers and is fixed to these with good adhesion. It can be a further characteristic feature of the invention that the foamed plastics material is stretched during manufacture so that the individual cells are given an elongated or lenticular shape, which causes that the foamed plastic material to shrink under the effect of heat when the cells endeavour to re-assume their spherical shape.

Figure 2:
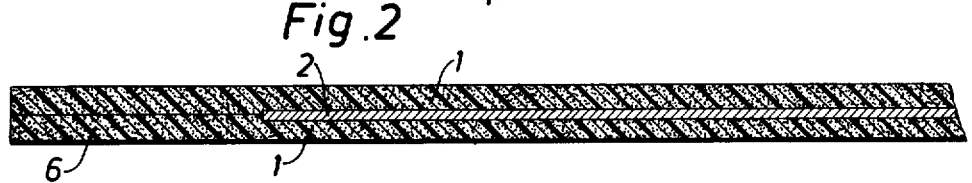
Figure 3:
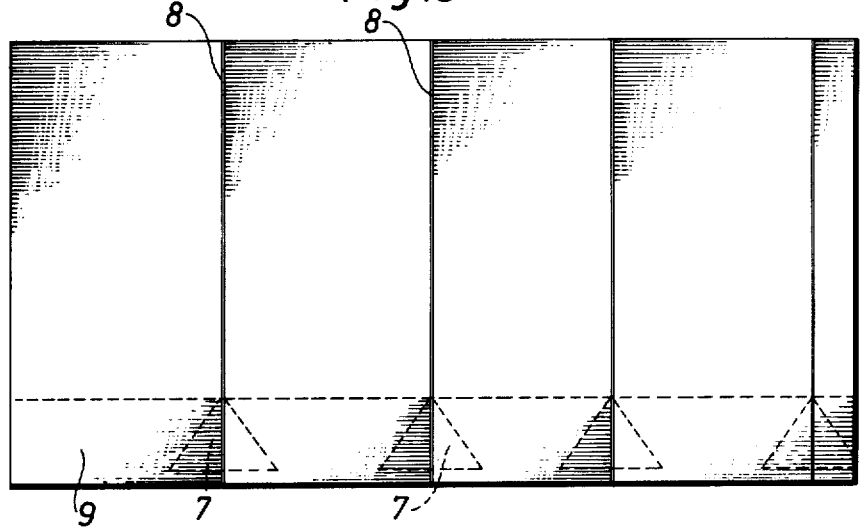
Figure 4:
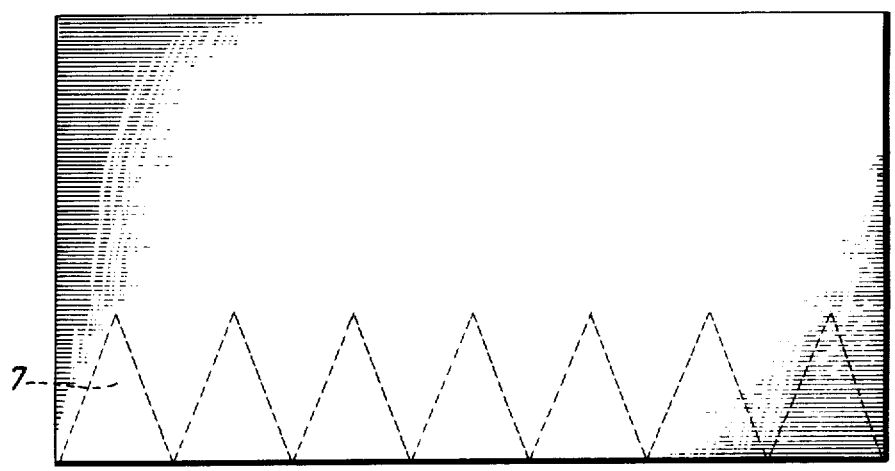
Figure 5:
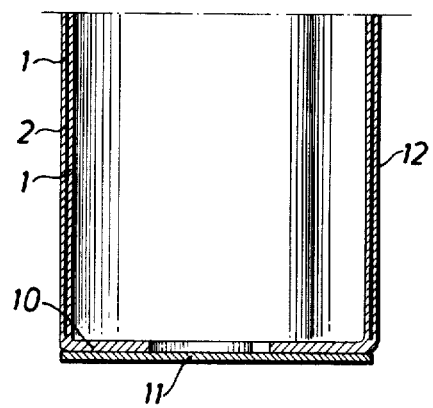
Figure 6:
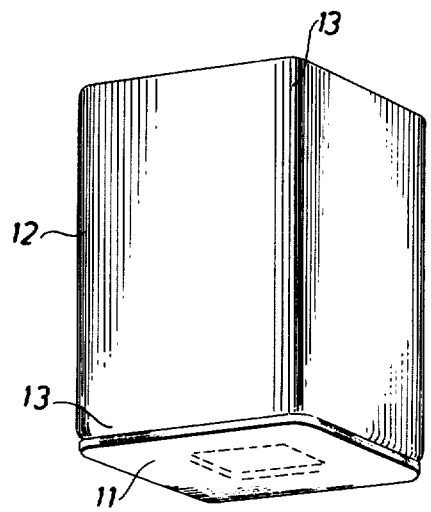
Figure 7:
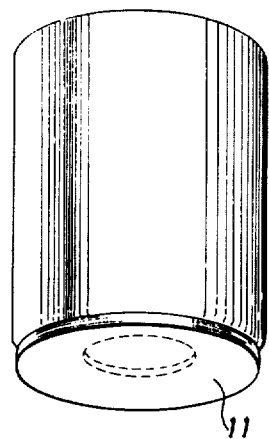
Figure 8:
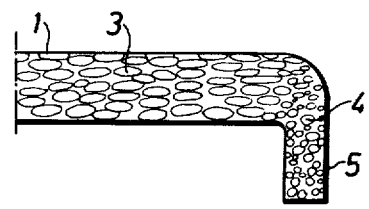

In the following some embodiments of the invention will be described with reference to the enclosed schematic drawings, in which FIG. 1 shows a greatly enlarged cross-section of a laminate in accordance with the invention, FIG. 2 shows a greatly enlarged cross-section of a part of a blank for a packing container, the blank having been made from a laminate in accordance with the invention, FIG. 3 shows a plan view of a blank made from the material in accordance with FIG. 2, FIG. 4 shows a modified form of the blank similar to FIG. 3, FIG. 5 shows a cross-section of a packing container manufactured from the laminate in accordance with the invention, FIG. 6 shows a perspective view of the container shown in FIG. 5, FIG. 7 shows a modified form of the packing container manufactured from the laminate in accordance with the invention, and FIG. 8 shows a greatly enlarged, schematic cross-section of a foamed plastic layer a part of which has been caused to shrink under the effect of heat.

In the laminated material in accordance with the invention shown in FIG. 1 the outer foamed plastic layers are designated by 1 and the intermediate homogeneous or fibrous layer by 2. In the present case it is assumed that the outer foamed plastics layers 1 consist of polystyrene foam and that these foamed plastics layers are manufactured by extrusion, and that the extruded foamed plastic material at the same time has been subjected to a stretching process before the plastic material has cooled so much that it has become stabilized. This stretching of the extruded foamed plastic material causes the individual cells 3 in the manner as shown in FIG. 8 to have an oblong or lenticular shape, depending on whether the plastic material has been stretched only in one or in two directions perpendicular to one another. These oblong or lenticular cells or bubbles, which have a much finer structure than that shown in FIG. 8, contract to a spherical shape when the plastic material is heated to such an extent that the individual cell walls are softened, and in FIG. 8 it is shown how the cells 4 after heating have assumed a spherical shape and the part 5 has been caused to shrink.

The outer foamed plastic layers 1 in the laminate shown in FIG. 1 are thus shrinkable when heat is applied to a sufficient extent, and this shrinking effect can be used to impart a form to the laminate. To make the laminate rigid and bendable without any risk of cracking creases arising, a layer 2 of a homogeneous or fibrous material, which is dimensionally stable e.g. a homogeneous plastics, paper, metal foil or glass film is introduced between the outer foamed plastic layers 1. Preferably, the layer 2 has a thickness of not more than 10% of the thickness of the outer foamed layers 1. It is a precondition for the achievement of the desired rigidity of the laminate, that the adhesion between the intermediate layer 2 and the outer layer 1 must be good, and therefore the intermediate layer of e.g. metal foil or glass film must be fixed to the outer layers 1 with the help of an adhesive or an intermediate layer which is capable of sticking to both materials. In the case shown in FIG. 1 the outer foamed plastic layers 1 are of equal thickness, which in certain cases is advantageous, since the neutral line on bending of the laminate will then go through the intermediate layer 2, but it is also possible to use outer foamed plastic layers 1 of different thickness, should this be desired. To enhance the impermeability to gas of the laminate, if the intermediate layer 2 in itself is not gas-tight, a thin layer of a gas tight plastic material, e.g. polyvinylidene chloride or an acrylonitrile, e.g. of the type which is marketed under the tradename BAREX, may be applied to the outside of one or both of the foamed plastic layers 1.

As mentioned above, the outer foamed plastic layers 1 are shrinkable through the application of heat, and this shrinkage effect may be used in such a manner that the foamed plastic material can be moulded, e.g. over a mandrel, if the material is first bent over to form a tube whose longitudinal edges are joined together. It has been found, however, that this moulding is made difficult and in many cases impossible owing to the intermediate layer 2 not being shrinkable, and in order to allow a utilization of the forming capacity of the foamed plastic it is shown in FIG. 2 how a blank for a packing container, manufactured from the laminate in accordance with FIG. 1, is provided with a cutout 6 of the inner, homogeneous or fibrous layer 2. In the manufacture of the blank in accordance with FIG. 2 the two foamed plastic layers 1 can be joined together in the area of the cutout 6 with the help of a thin adhesive layer which does not prevent the shrinking process, e.g. an elastic glue.

In FIG. 3 and 4 are shown blanks for packing containers, which blanks are manufactured from the laminate in accordance with FIG. 1 and 2. The blank shown in FIG. 3 is of the type which is intended to be bent to form a packing container of a square cross-section, by folding the blank along the folding lines 8. The tube of square cross-section formed in such a manner is threaded onto a mandrel, whereupon a portion 9 of the tube formed, which projects from the end of the mandrel, is heated up to such an extent that it is caused to shrink, whereby the projecting part 9 will be caused to form a close fit against the end surface of the mandrel. Since the homogeneous or fibrous intermediate layer 2 causes wrinkle formation in the corner portions, the blank in accordance with FIG. 3 has been provided with cutouts 7 in the intermediate layer 2, and, as can be seen from the figure, the cutouts shown here are nearly triangular and are located so that one point of the triangles coincides with the corners created when part 9 is folded in by shrinkage. As there is no shrinkage along the edges of portions 7 there will also be no formation of wrinkles, and the shrunk-in flange is given an even and attractive appearance and forms an excellent base to be covered with a cover disc by heat-sealing.

The blank shown in FIG. 4 is intended chiefly for being made into a packing container of circular cylindrical cross-section, and so as to avoid the aforementioned wrinkle formation of the intermediate layer 2, which may occur when the shrinkable laminate is moulded over a mandrel, the blank in FIG. 4 has been provided with flaplike cutouts 7 of the intermediate layer 2, which cutouts make it possible to carry out the shrinkage over a mandrel without any appreciable wrinkle formation.

The blanks in accordance with FIG. 3 and 4 can appropriately be made so that a web of stretched foamed plastic material is assembled with and laminated to an intermediate layer of homogeneous of fibrous material, which intermediate layer has previously been provided with cutouts 7, whereupon the laminate so formed is laminated to another stretched foamed plastic layer 1 in such a manner that the homogeneous or fibrous layer 2 will form an intermediate layer.

The cross-section through a packing container in accordance with the invention as shown in FIG. 5 has a cylindrical shell part 12 which consists of the laminate in accordance with the invention, having the outer foamed plastics layers 1 and the intermediate homogeneous or fibrous layer 2. The cylindrical shell part 12 of the packing container continues into a shrunk-in flange 10, which is moulded in the manner described above over a mandrel, and, as can be seen from the section according to FIG. 5, the shrunk-in flange is not provided with any intermediate layer 2. To provide a tight base of the packing container and at the same time form a plane standing surface, a cover disc 11 has been sealed to the outside of the shrunk-in flange 10 by e.g. heat-sealing or with the help of an adhesive that can be activated by heat, a so-called hot-melt. The base disc or base plate 11 can be made of a laminate in accordance with the invention, or it may also consist of simple foamed plastic or any other suitable material. In FIG. 6 is shown a schematic perspective view of the packing container in accordance with FIG. 5, where it is also shown that the container body 12 has no sharp edges but instead rounded transitions 13 between the sidewalls of the package body and the base cover plate 11. This design of the container body imparts to the packing container a considerable rigidity and gives the packing container an attractive appearance.

The packing container shown in FIG. 7 is a circular-cylindrical variant of the packing container shown in FIG. 6.

As made evident by the above, the basic principle of the invention consists in the combination of the shrinkable polystyrene foam layers with a dimensionally stable homogeneous or fibrous intermediate layer 2 which has substantially higher tensile strength than the foamed plastic layers, which means that the laminated material as a whole will have a relatively high tensile strength at the same time the rigidity of the laminate will increase considerably compared with the rigidity which each of the layers by itself can provide, and a further advantage consists in that the risk of cracking creases occuring in the foamed plastic material is considerably reduced. An important part of the invention is moreover that the shrinking properties of the foamed plastic material can be utilized in spite of the intermediate layer, in that the blanks for the packing containers manufactured from the laminate in accordance with the invention are provided with cutouts in the intermediate layer along those parts which are intended to be deformed to a substantial extent by causing the foamed plastic material to shrink under the effect of heat.

In the embodiment of the invention shown and described here the two layers of foamed plastic material have about the same thickness, but it has been found that the stiffness of the laminate material can be increased if the intermediate layer 2 of homogeneous or fibrous material is not located centrally in the laminate but located near to one side of the laminate. This means of course that the layers of foamed plastics material will not have the same thickness. When the intermediate layer 2 is asymmetrically located in the laminate, the shrinking ability of the laminate is increased, as the deformation will be dominated by the shrinking of (the thicker layer).

In order to achieve a maximum strength against outer strain the homogeneous or fibrous intermediate layer 2 can be located as close to the outside of the finished package as possible.

It has been found that the laminate and the blanks in accordance with the invention are relatively simple to manufacture and that they have substantial advantages over known laminates which include foamed plastic layers. It has also been found that great freedom exists in the choice of materials for the intermediate layer 2 and in the adapting of the same according to the properties which one wishes the laminate to have. Thus for example by using a metal foil or a glass film it is possible to produce a completely gas-tight laminate.

We claim:

1. A blank of carton-forming material for manufacturing containers said blank comprising a laminate having two layers of polystyrene foam in which the cellular structure has lenticular shaped cells created by stretching the polystyrene foam when being initially extruded to form the layers and an intermediate layer disposed between and adhered to said polystyrene foam layers, said intermediate layer being dimensionally stable and provided with at least one cut-out portion adjacent at least one edge of the blank, whereby when the blank is erected to form a container the polystyrene foam layers may be heated in the area of the at least one cut-out portion in the intermediate layer so as to shrink the foam layers to provide inwardly folded portions forming at least one part of the container made from the blank.

2. A blank as claimed in claim 1 wherein the thickness of the intermediate layer is not more than 10% of the thickness of the polystyrene foam layers.

3. A blank as claimed in claim 1 and further comprising a gas impermeable layer disposed on that side of the blank which will form the inside of the container.

4. A blank as claimed in claim 1 wherein the two polystyrene foam layers have the same thickness.

5. A blank as claimed in claim 1 wherein the layers of polystyrene foam have different thicknesses.

6. A blank as claimed in claim 1 wherein the cut-out portions in the intermediate layer are located adjacent an edge of the blank which when erected to form a container forms the bottom of the container.

7. A blank as claimed in claim 1 wherein those portions of the blank forming the side walls of the erected container have substantially continuous layers of foamed polystyrene and the intermediate layer.

8. A packing container formed from a blank as claimed in claim 1 wherein the inwardly folded heat-shrunk portions of the blank constitute the bottom of the container and further comprising a flat closure member sealed to the inwardly folded portion to close and seal the bottom of the container.

* * * * *